(12) United States Patent
Desai et al.

(10) Patent No.: US 10,659,953 B2
(45) Date of Patent: May 19, 2020

(54) FABRIC AWARE SMART CLIENT STEERING FOR SERVICE PROVIDER WI-FI NETWORKS

(71) Applicant: Cisco Technology, Inc., San Jose, CA (US)

(72) Inventors: Vishal S. Desai, San Jose, CA (US); Sanjay K. Hooda, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/867,547

(22) Filed: Jan. 10, 2018

(65) Prior Publication Data

US 2018/0367981 A1 Dec. 20, 2018

Related U.S. Application Data

(60) Provisional application No. 62/521,198, filed on Jun. 16, 2017.

(51) Int. Cl.
| | |
|---|---|
| *H04L 12/28* | (2006.01) |
| *H04W 8/08* | (2009.01) |
| *H04W 36/00* | (2009.01) |
| *H04W 84/12* | (2009.01) |
| *H04W 8/10* | (2009.01) |
| *H04W 36/08* | (2009.01) |

(52) U.S. Cl.
CPC ....... *H04W 8/082* (2013.01); *H04W 36/0061* (2013.01); *H04W 8/10* (2013.01); *H04W 36/08* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 8,934,369 B2 | 1/2015 | Cao et al. | |
| 9,253,693 B2 | 2/2016 | Pang et al. | |
| 9,277,468 B2 | 3/2016 | Nagaraja et al. | |
| 2007/0258393 A1* | 11/2007 | Cam-Winget | G01S 5/02 370/310 |
| 2010/0067371 A1* | 3/2010 | Gogic | H04W 36/0083 370/216 |
| 2010/0202406 A1* | 8/2010 | Feder | H04W 36/00835 370/331 |
| 2013/0150046 A1* | 6/2013 | Gogic | H04W 36/0083 455/436 |

(Continued)

*Primary Examiner* — Phirin Sam
(74) *Attorney, Agent, or Firm* — Patterson + Sheridan, LLP

(57) ABSTRACT

Embodiments herein describe pruning a neighbor list sent to a client device using a predefined assignment corresponding to an AP or the client device which can reduce the time required for the client device to roam between APs in a WLAN deployment. The pruned neighbor list serves as a Wi-Fi client steering mechanism to affect which AP the client device chooses when roaming. In one embodiment, a controller uses information regarding fabric nodes in the backend infrastructure to prune the neighbor list to include only the APs that are assigned to the same fabric node as the current AP. In another embodiment, the controller considers a service provider corresponding to the client device when pruning the neighbor lists. The list may include only the neighboring APs assigned to provide Wi-Fi access for the same service provider.

17 Claims, 7 Drawing Sheets

(56) References Cited

U.S. PATENT DOCUMENTS

| | | | | |
|---|---|---|---|---|
| 2014/0378137 A1* | 12/2014 | Olofsson | ............... | H04W 24/02 |
| | | | | 455/436 |
| 2015/0289225 A1* | 10/2015 | Gao | .................... | H04W 64/003 |
| | | | | 455/456.5 |
| 2017/0093687 A1* | 3/2017 | Wu | ....................... | H04L 45/122 |

* cited by examiner

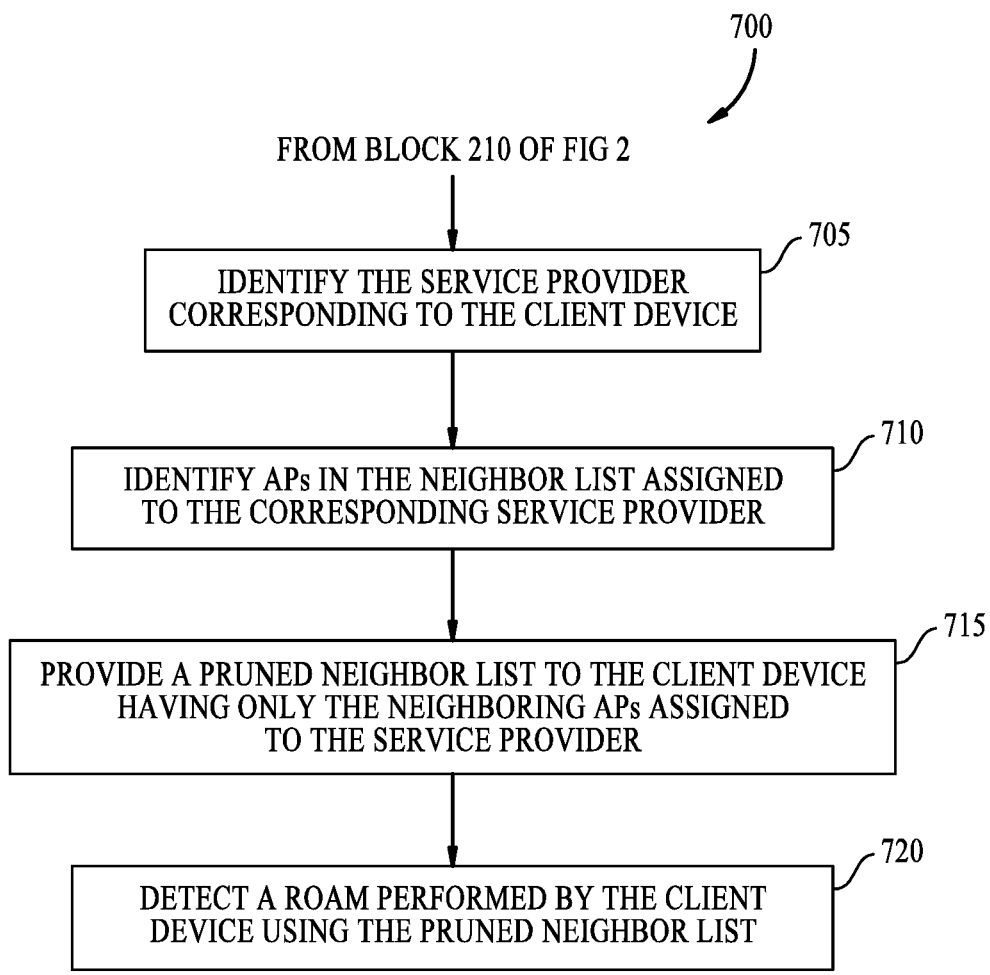

FABRIC AWARE SMART CLIENT STEERING FOR SERVICE PROVIDER WI-FI NETWORKS

CROSS-REFERENCE TO RELATED APPLICATIONS

This application claims benefit of U.S. provisional patent application Ser. No. 62/521,198, filed Jun. 16, 2017. The aforementioned related patent application is herein incorporated by reference in its entirety.

TECHNICAL FIELD

Embodiments presented in this disclosure generally relate to providing pruned neighbor lists to client devices used when roaming between access points (APs).

BACKGROUND

Wireless local area network (WLAN) deployments have many applications that govern client association and roaming between APs. Previous optimizations that determine client association trends or load balancing using roaming policies are based on the combination of Wi-Fi radio characteristics, spectrum availability, and type of client traffic. These optimizations, however, are agnostic of backend infrastructure of Wi-Fi APs. The time required for a client to roam can take hundreds of milliseconds depending on the backend infrastructure—e.g., if the client roams between APs coupled to different switches in the backend infrastructure. However, an intra-switch roam (e.g., a roam between APs coupled to the same switch) can take only a few milliseconds (e.g., 10 milliseconds).

In addition, the optimizations mentioned above also ignore the effect that multi-tenancy Wi-Fi services have on roaming. The multi-tenancy Wi-Fi services permit a single AP to have a common service set identifier (SSID) provisioned for multiple services providers (SP) where service level agreements (SLAs) could vary based on the SP type. The time required for a client device to roam can vary depending on the SLAs and the provisioning of the APs. As such, the backend infrastructure and the SLAs can cause the time required for a client device to roam to vary widely.

BRIEF DESCRIPTION OF THE DRAWINGS

FIG. 7 is a flowchart for pruning neighbor lists depending on the SP type of a client device, according to an embodiment described herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
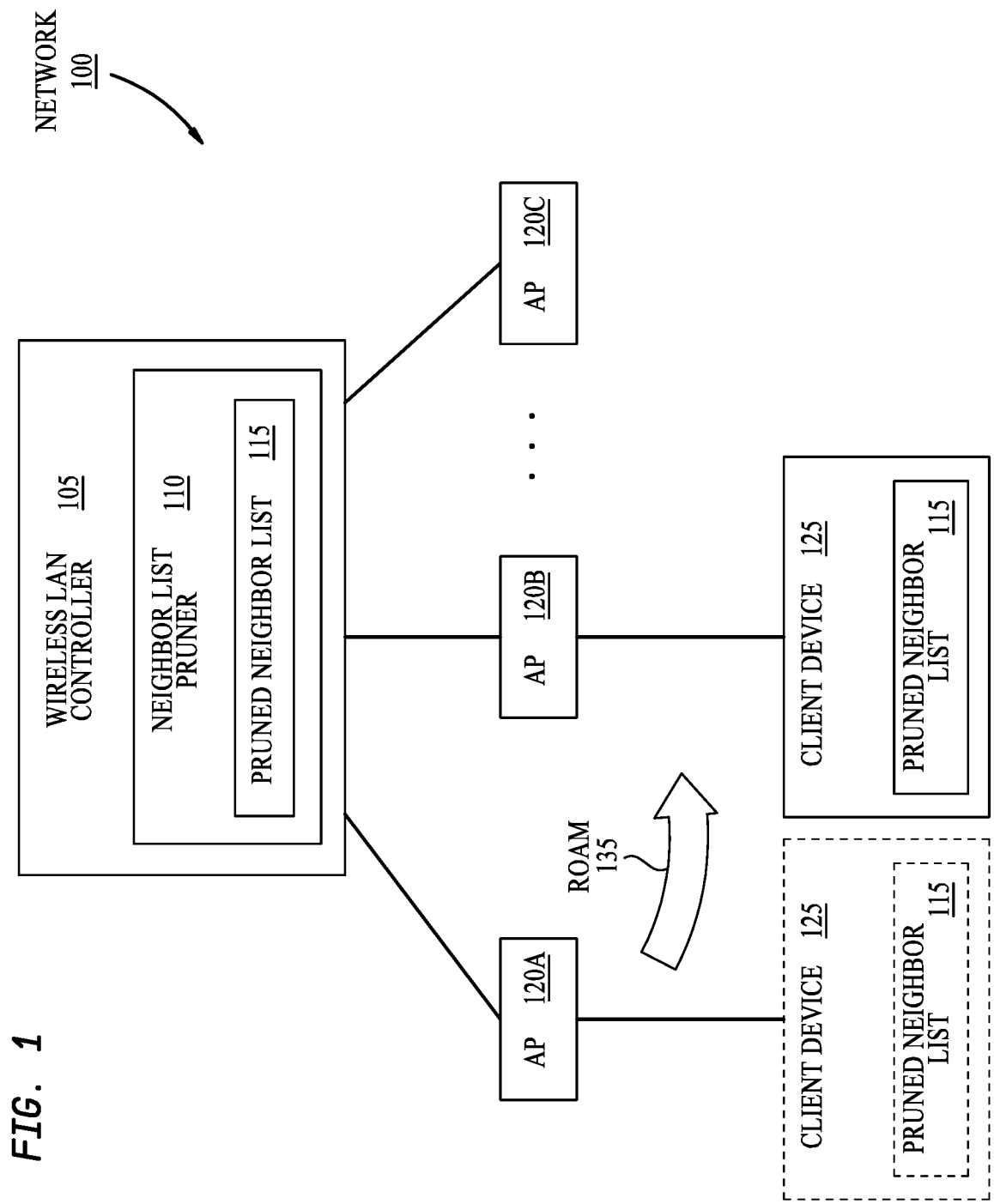
FIG. 1 illustrates a network with a client device roaming between APs, according to an embodiment described herein.

One embodiment presented in this disclosure is a wireless network controller that includes a processor and memory configured to store an application which, when executed by the processor, is configured to perform an operation. The operation includes receiving a list of neighboring APs for a first AP communicating with a client device and pruning the neighbor list based on a predefined assignment corresponding to at least one of the first AP or the client device where the pruned neighbor list includes a second AP. The operation includes forwarding the pruned neighbor list to the client device and detecting, after forwarding the pruned neighbor list, the client device has roamed from the first AP to the second AP listed in the pruned neighbor list.

Another embodiment described herein is a method that includes receiving a list of neighboring APs for a first AP communicating with a client device and pruning the neighbor list based on a predefined assignment corresponding to at least one of the first AP or the client device where the pruned neighbor list includes a second AP. The method includes forwarding the pruned neighbor list to the client device and detecting, after forwarding the pruned neighbor list, the client device has roamed from the first AP to the second AP listed in the pruned neighbor list.

Another embodiment described herein is a non-transitory computer-readable storage medium storing instructions, which when executed on one or more processing devices, perform an operation for influencing roaming of a client device. The operation includes receiving a list of neighboring APs for a first AP communicating with a client device and pruning the neighbor list based on a predefined assignment corresponding to at least one of the first AP or the client device where the pruned neighbor list includes a second AP. The operation includes forwarding the pruned neighbor list to the client device and detecting, after forwarding the pruned neighbor list, the client device has roamed from the first AP to the second AP listed in the pruned neighbor list.

Example Embodiments

Embodiments herein describe pruning neighbor lists sent to client devices which may reduce the time required for client devices to roam between APs in a WLAN deployment. The pruned neighbor lists serves as a Wi-Fi client steering mechanism to affect which AP the client device chooses when roaming. In one embodiment, a controller uses information regarding fabric nodes in the backend infrastructure when responding to 802.11k and/or 802.11v BSS transition capable requests for neighbor list information. Typically, the AP provides a neighbor list to a client device that includes all of the APs that are within wireless communication range. However, in one embodiment, the controller prunes the list to include only the APs in the list that are assigned to the same fabric node as the AP the client device is currently associated with. Roaming to an AP in the same fabric node may require only a few milliseconds while roaming to an AP in a different fabric node can require hundreds of milliseconds.

In another embodiment, the controller considers a SP assigned to the client device when pruning the neighbor lists. For example, the APs may be provisioned to provide Wi-Fi access to client devices subscribed to different SPs (e.g., different cellular networks). For instance, a first AP may provide Wi-Fi access for client devices (e.g., cellular phones) that use a first SP while a second AP may provide Wi-Fi access for client devices that use a second SP. In this scenario, before providing the neighbor list to a client device using the first SP, the controller may prune the second AP that is assigned to service client devices subscribed to the second SP. That way, roaming time can be reduced since the client devices are steered to a neighboring AP assigned to the same SP rather than attempting to roam to an AP assigned to a different SP (and getting denied).

FIG. 1 illustrates a network 100 with a client device 125 roaming between APs 120, according to an embodiment described herein. The APs 120 have wired or wireless connections to a wireless LAN controller (WLC) which can be a separate network device (e.g., a computing system comprising a processor and memory) or one of the APs 120 which serves as the WLC 105 for the network 100. For example, the WLC 105 can be a software application executed by one of the APs 120.

The WLC 105 includes a neighbor list pruner 110 which generates a pruned neighbor list 115 using information provided by the APs 120. For example, the APs 120 may transmit neighbor lists 115 to any client devices 125 that are IEEE 802.11k and/or 802.11V BSS transition compatible. To do so, the APs 120 may first identify its neighboring APs. As used herein, neighboring APs signify the APs 120 within wireless range of an AP 120. The APs 120 do not need to have established wireless communication to be considered as neighbors but can at least receive wireless signals—e.g., beacons, probes, packets, etc. The APs 120 may listen (or actively send probes or beacons) to identify their neighboring APs. In FIG. 1, it is assumed that AP 120B and AP 120C are neighboring APs for AP 120A.

Instead of sending the complete list of neighboring APs to the client device 125, each of the APs 120 can send a list of neighboring APs to the WLC 105, according to one embodiment. In turn, the WLC 105 uses a predefined assignment corresponding to the APs 120 or the client device 125 to potentially eliminate one of the neighboring APs in the list to generate the pruned neighbor list 115. For example, the neighbor list pruner 110 may remove neighboring APs that are part a different fabric node than the AP 120 or neighboring APs that are not assigned to service the SP (e.g., a cellular network) of the client device 125 (e.g., a cellular phone).

Once receiving the pruned neighbor list 115, the client device 125 can choose one of the APs on the list when roaming. In one embodiment, an IEEE 802.11k compatible client device 125 is not forced to roam only to the APs in the pruned neighbor list 115, but rather the list 115 can serve as a client steering mechanism for helping the client device 125 select a new AP 120. However, for client devices 125 that support IEEE 802.11v BSS transition request, the candidate APs for roaming are limited to those listed in the pruned neighbor list 115. Moreover, the client device 125 may also consider other factors when selecting an AP 120 to roam to such as a received signal strength indications (RSSI) between the client device 125 and the APs 120 as well as other performance indicators.

In FIG. 1, the neighbor list pruner 110 may remove the AP 120C from the neighbor list received from the AP 120A. For example, the AP 120C may be connected to a different fabric node than AP 120A or be assigned to provide Wi-Fi access to subscribers of a different SP than the one used by the client device 125. In any case, the pruned neighbor list 115 provided to the client device 125 by the AP 120A may include the AP 120B but omit the AP 120C despite the AP 120C neighboring the AP 120A. As shown, using the pruned neighboring list 115 (as well as other possible factors), the client device 125 performs a roam 135 from the AP 120A to the AP 120B. As mentioned above, in one embodiment, the client device 125 may nonetheless decide to roam to the AP 120C even though the AP 120C is omitted from the pruned neighbor list 115.

In one embodiment, the neighbor list 115 changes once the client device 125 roams from the AP 120A to the AP 120B. That is, the neighbor list pruner 110 may generate different neighbor lists 115 for each of the APs 120. Thus, the neighbor list pruner 110 can send a different or updated neighbor list 115 to the client device 125 after the client device 125 associates with the AP 120B.

Figure 2:
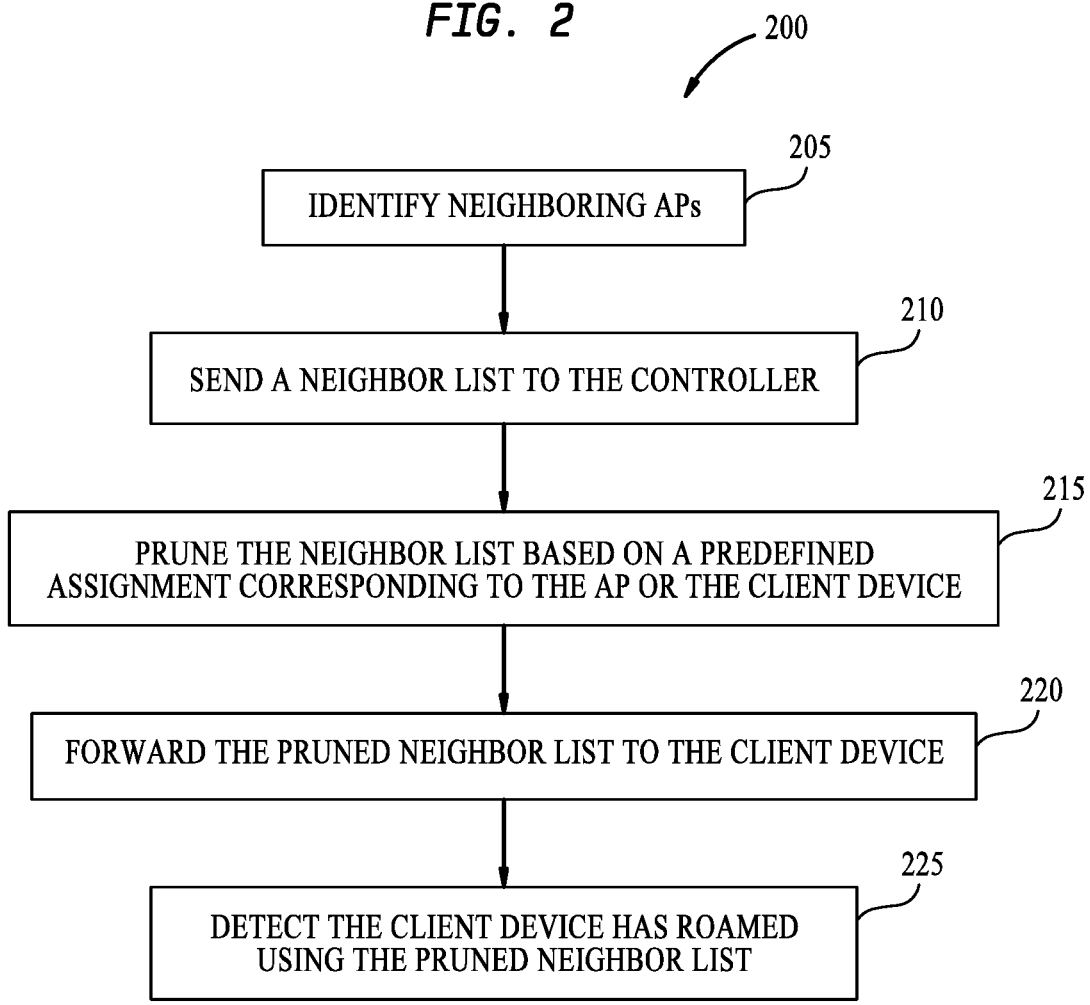
FIG. 2 is a flowchart for pruning a neighbor list provided to a client device, according to an embodiment described herein.

FIG. 2 is a flowchart of a method 200 for pruning a neighbor list provided to a client device, according to an embodiment described herein. At block 205, an AP identifies neighboring APs. As above, the AP can listen for received wireless communications from other APs in the WLAN deployment to identify the neighboring APs. In one embodiment, the AP waits for a request from an associated client device before identifying the neighboring APs. For example, before initiating a roam, the client device may transmit a request (e.g., an 802.11k and/or 802.11v BSS transition capable request) for the neighbor list from the AP. In another example, the AP may at intervals identify the neighboring APs (even without being prompted by the client devices associated with the AP).

At block 210, the AP sends the neighbor list to the controller—e.g., the WLC. In one embodiment, the AP sends a list that includes all of the neighboring APs which are in wireless communication range of the AP. However, in another embodiment, the AP may send a list that does not include all of the neighboring APs. For example, the AP may use RSSI measurements corresponding to the neighboring APs to preemptively prune some of the APs. For example, the AP may not add neighboring APs to the list transmitted to the controller unless corresponding RSSI measurements are above a threshold.

At block 215, the neighbor list pruner in the controller prunes the neighbor list based on a predefined assignment corresponding to the AP or the client device. In one embodiment, the controller removes from the neighbor list the APs that are assigned to a different fabric node (e.g., the APs that use a different portion of the backend infrastructure) than the AP sending the list. In another embodiment, the controller removes from the neighbor list the APs not assigned to provide Wi-Fi access for subscribers of the same SP as the client device. These two different embodiments are discussed separately in the following Figures. In other embodiments, neighbor list pruner prunes the neighbor list using other client steering mechanisms such as the load across the neighboring APs and the inter-AP coverage overlap which can affect which APs are better targets for the client device.

At block 220, the controller forwards the pruned neighbor list to the AP which provides the list to the client device. In one embodiment, the controller and AP provide neighbor lists to each client device associated with the AP. The neighbor lists for the clients may be the same or different.

That is, the AP and controller can generate a pruned neighbor list for one of the client devices coupled to the AP that includes a different neighboring AP than a pruned neighbor list provided to another client device associated with the AP.

At block 225, the controller detects when the client device roams. In one embodiment, the client device selects the new AP from the list of APs in the pruned neighbor list. The client device can also use different parameters such as RSSI, quality of service, available bandwidth, and the like to select between the APs in the pruned neighbor list. For example, one of the APs in the pruned neighbor list may be closer to the client device (e.g., has a larger RSSI) but is busier than another AP on the list (e.g., has less available bandwidth or more associated clients). Using a weighting function, the client device may select the AP that is further away but is less busy than another AP in the pruned neighbor list.

As described previously, the client device may roam to an AP that is not included in the neighbor list. For example, even though the new AP may be on a different fabric node than the previous AP, the client device may select the new AP because it has a higher RSSI or more available bandwidth. However, doing so may mean it takes longer for the client device to complete the roam. For example, instead of performing a Layer 2 (L2) roam, the client device may have to perform a Layer 3 (L3) roam which can take hundreds of milliseconds longer. Thus, although the client device may not be forced to select one of the APs in the pruned neighbor list, doing so may result in smaller roam times than selecting a neighboring AP that was pruned from the list by the controller.

Figure 3:
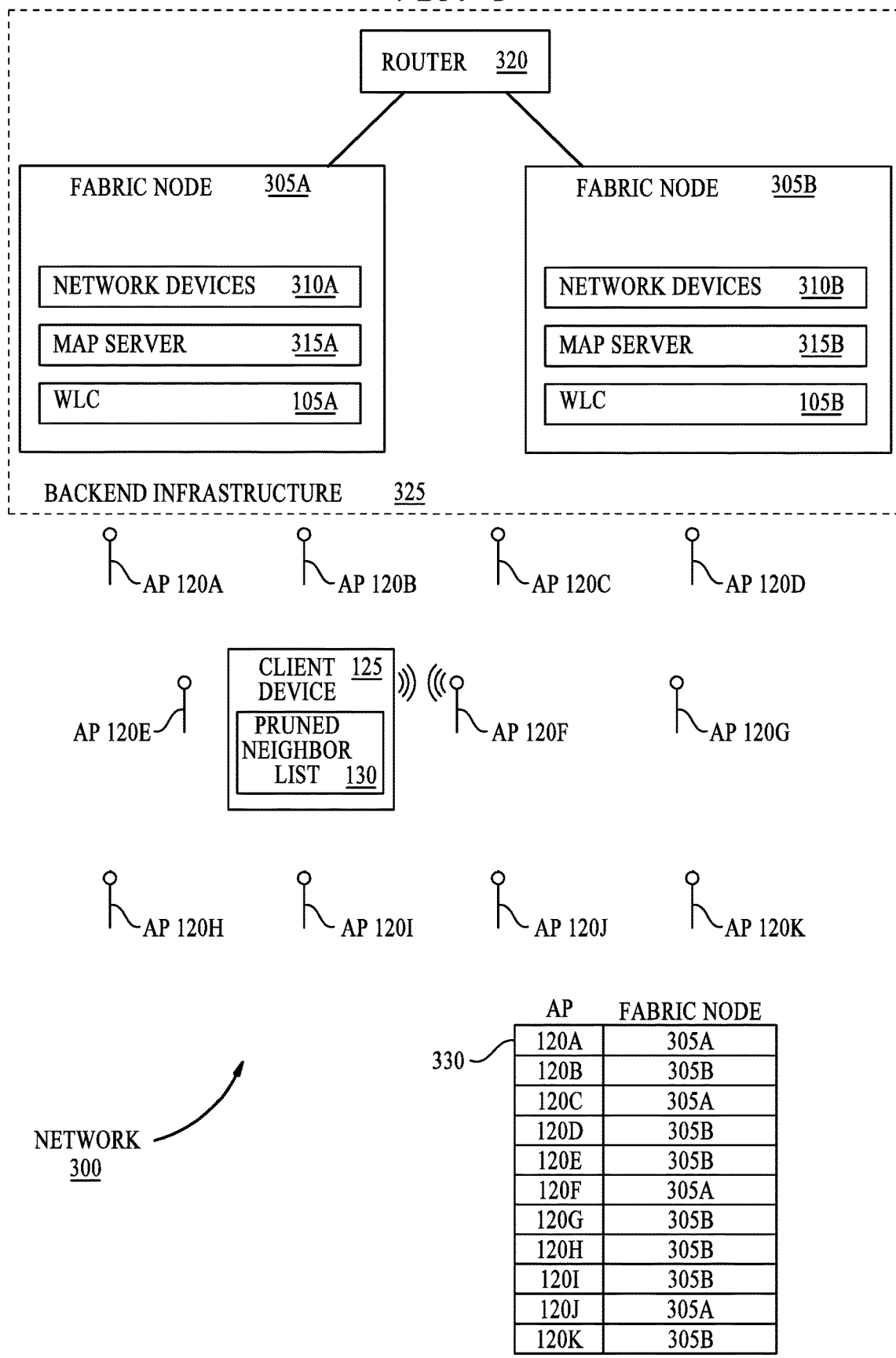
FIG. 3 illustrates a network with a backend infrastructure organized into different fabric nodes, according to an embodiment described herein.

FIG. 3 illustrates a network 300 with a backend infrastructure 325 organized into different fabric nodes 305, according to an embodiment described herein. As shown, the fabric nodes 305 includes multiple network devices 310 (e.g., switches and/or routers), a map server 315, and the WLC 105. In one embodiment, the fabric nodes are generated and maintained using the techniques described in US Patent Publication 20170041222 which is incorporated by reference. Although FIG. 3 illustrates that the fabric nodes 305A and 305B have their own map servers 315 and WLCs 105, in one embodiment, the nodes 305A and 305B may share the same map server 315 and WLC 105. In one embodiment, there is a single stack of map servers per deployment that carry information about L2/L3 routes. But there can be multiple servers segregated behind a hot standby routing protocol (HSRP) group. In this example, we assume a single map server per site, but the embodiments here also work on multiple map servers.

In one embodiment, the fabric nodes 305 group the network devices 310 into one, larger virtual network device to the perspective to external network devices (e.g., the APs 120) which communicate with the network devices 310 in the fabric nodes 305. For example, the fabric node 305A may include four switches which each include forty ports. To the perspective of an AP 120 connected to one of these switches, it appears to the AP 120 it is communicating with one switch that has 160 ports. To create the large, virtual network device, the network device 310 may have the same configurations and use the same policies when routing traffic. In this manner, the network devices 310 in the backend infrastructure 325 can be clustered or grouped to form the fabric nodes 305A and 305B. Moreover, the backend infrastructure can include network devices which permit the fabric nodes 305 to communicate with each other such as a router 320.

In one embodiment, each of the APs 120 is connected using a wired or wireless connection to one of the fabric nodes 305. Put differently, each of the APs 120 is assigned to one of the fabric nodes 305. FIG. 3 includes a chart 330 that illustrates the assignment of each of the APs 120 to a corresponding fabric node 305. In this example, the locations of the APs 120 assigned to the fabric node 305A are interleaved or intermingled with the locations of the APs 120 assigned to the fabric nodes 305B. Thus, the APs 120 may have overlapping coverage areas. For example, the coverage area of AP 120A, which is assigned to the fabric node 305A, may overlap at least partially with the coverage areas of the adjacent APs 120B and 120E which are assigned to the fabric node 305B. When deploying the network 300, the system administrator may intentionally set the spacing between the APs 120A, 120B, and 120E such that the client devices in the coverage area of the AP 120A may also be in the coverage area of the APs 120B or 120E. Doing so improves the availability of the network 300. If the fabric node 305A goes down or is otherwise unavailable, the client devices associated with the AP 120A (which has lost its connection to the backend infrastructure 325) can move to the AP 120B or the AP 120E and still access an external network—e.g., the Internet—using the fabric node 305B.

In the network 300, the client device 125 is currently associated with the AP 120F. Because the AP 120F is assigned to the fabric node 305A, the client device 125 relies on the network devices 310A in the backend infrastructure 325 in order to communicate with other external networks. Moreover, the WLC 105A in the fabric node 305A can provide the pruned neighbor list 130 which identifies neighboring APs in the network 300 that are also assigned to the fabric node 305A. For example, the AP 120F may transmit a list of its neighbor APs to the WLC 105A which can include APs 120 that in both fabric nodes 305A and 305B (e.g., APs 120B, 120C, 120E, 120G, 120I, and 120J). Using the information contained in the map server 315A, the WLC 105A determines which of those neighbor APs are assigned to the fabric node 305A and then forwards the pruned neighbor list 130 to the client device 125 which includes only the APs assigned to the fabric node 305A—e.g., APs 120C and 120J. The client device 125 can use the pruned neighbor list 130 as well as other performance parameters to identify a target AP when roaming.

Figure 4:
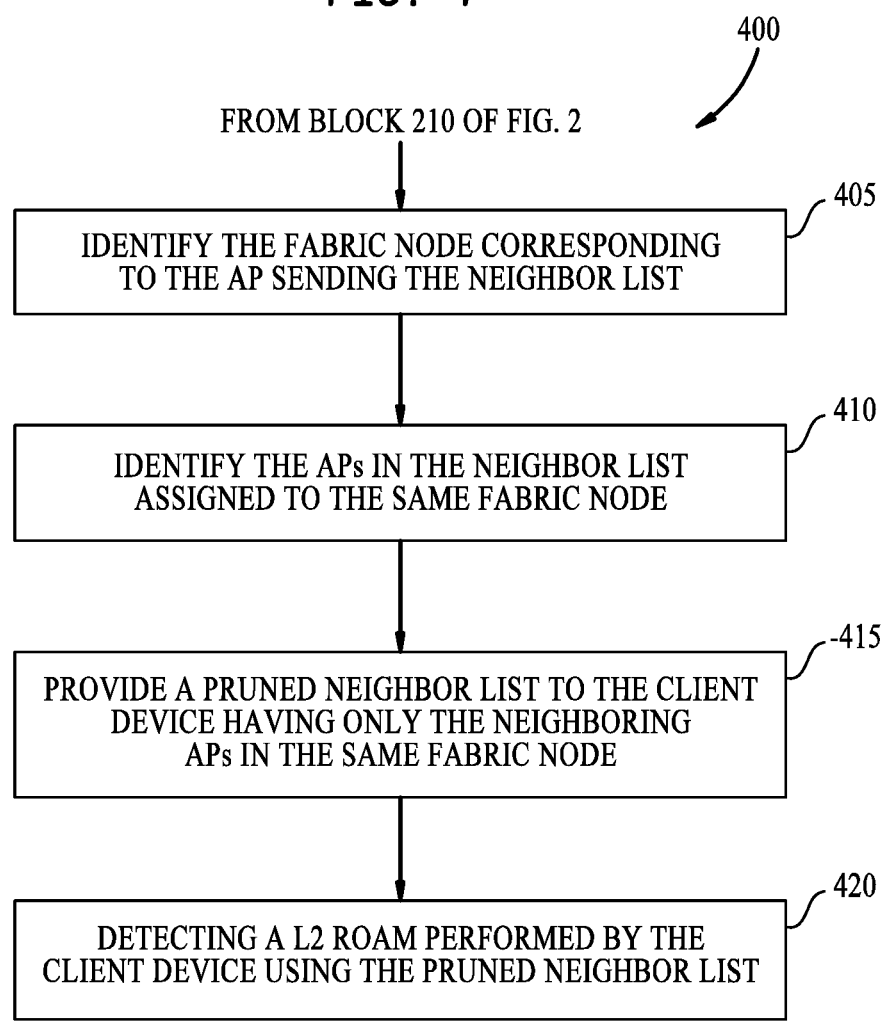
FIG. 4 is a flowchart for pruning a neighbor list using the assignment of the APs to the fabric nodes, according to an embodiment described herein.

FIG. 4 is a flowchart of a method 400 for pruning a neighbor list using the assignment of the APs to the fabric nodes, according to an embodiment described herein. The method 400 may begin after block 210 of FIG. 2 where the AP that is currently associated with the client device sends a list of neighboring APs to the WLC. At block 405, the WLC identifies the fabric node corresponding to the AP sending the neighbor list. Using FIG. 3 as an example, the AP 120F sends the list of its neighbors to the WLC 105A which determines that the AP 120F is in the fabric node 305A.

At block 410, the WLC identifies the APs in the neighbor list assigned to the same fabric node as the current AP. These APs are referred to as preferred access nodes. These preferred access nodes could be either part of the same switch or unique access switch group (i.e., a virtual switch forming a fabric node) within the fabric where applied policies are the same. As mentioned above, the WLC can use a map server to identify which of the APs in the neighbor list are assigned to the same fabric node as the AP. In one embodiment, the map server stores the L2 MAC addresses for the APs in the fabric node. The map server can push this information the WLC which can then identify which of the APs are in the same fabric node and which are not.

At block 415, the WLC provides a pruned neighbor list to the client device that contains only the neighboring APs in the same fabric node. If all of the neighboring APs are assigned to the same fabric node, then the pruned neighbor list is the same as the original neighbor list provided by the AP currently connected to the client device. However, in the deployment illustrated in FIG. 3 where the APs assigned to the different fabric nodes are intermingled, at least one of the neighboring APs is likely assigned to a different fabric node. As such, the WLC removes these APs from the neighbor list and then provides the pruned neighbor list to the AP which then forwards it to the client device.

At block 420, the WLC detects a L2 roam performed by the client device using the pruned neighbor list. In one embodiment, the client device may be a mobile device which may roam between the APs as it changes geographic locations in the wireless network deployment. When deciding to roam to a different AP, the client device uses the pruned neighbor list to identify a target AP. If the client device selects an AP in the pruned neighbor list, the client device can perform a L2 roam rather than a L3 roam which can take hundreds of milliseconds longer to perform. While a L3 roam may require inter-fabric node communication to complete (e.g., a network device in the old fabric node sends information to a network device in the new fabric node), a L2 roam can be completed using only intra-fabric node communication. For example, the map server is updated to reflect the new AP the client device has roamed to, which does not require communicating with a different fabric node.

Figure 5:
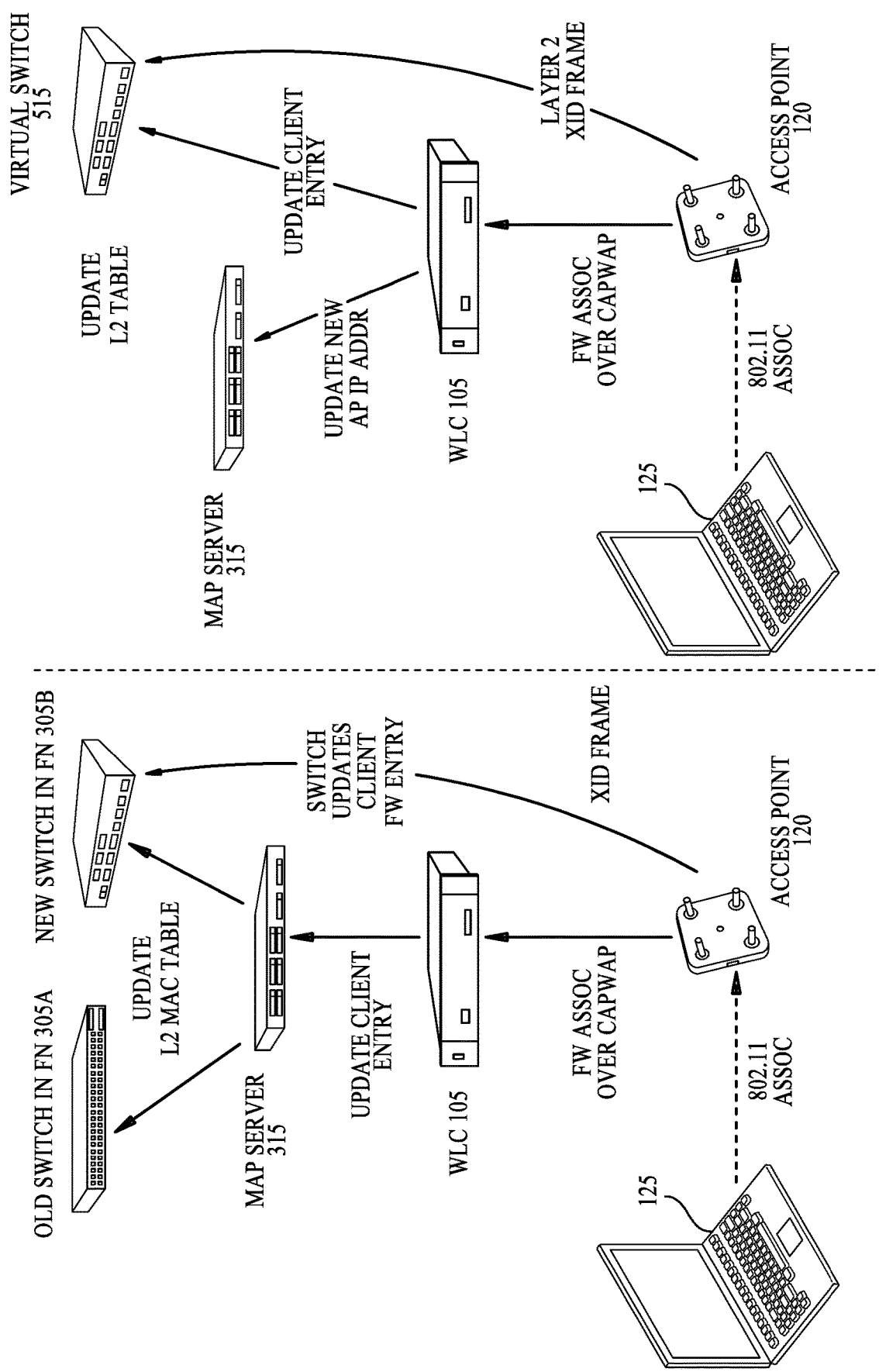
FIG. 5 illustrates performing Layer 2 and Layer 3 roams, according to an embodiment described herein.

FIG. 5 illustrates performing L2 and L3 roams, according to an embodiment described herein. Specifically, the left side of FIG. 5 illustrates performing a L3 roam 505 while the right side illustrates performing a L2 roam 510. As shown in the bottom left, the client device 125 roams to the AP 120 which is in a different fabric node than the source AP that the client device 125 was previously connected. The AP 120 transmits an exchange station identification (XID) frame to the new switch which in is the new fabric node 305B. Put differently, the AP 120 informs the switch it is coupled to in the fabric node 305B that the client device 125 has joined the AP 120.

The AP 120 also informs the WLC 105 that the client device 125 has recently joined the AP 120. In this example, the WLC 105 and the map server 315 are shared by both the fabric nodes 305A and 305B. In response to the information provided by the AP 120, the WLC updates a corresponding client entry in the map server 315 to indicate the new location of the client device 125. The map server 315 then updates the L2 MAC tables in the new switch in fabric node 305B and the old switch in the fabric node 305A. Because updating the old switch in the fabric node 305B may require using a router (e.g., the router 320 in FIG. 3) which is communicatively coupled to both of the fabric nodes 305A and 305B, the L3 roam 505 can take hundreds of milliseconds (e.g., between 500-1000 milliseconds). In addition, network authentication methods that require backend infra access for Authentication Authorization and Accounting (AAA)/Radius Server may induce additional time penalties.

When performing the L2 roam 510, the AP 120 sends a L2 XID frame to the virtual switch 515 in the fabric node 305A. That is, because the switches in the fabric node 305A are virtualized and function as a single virtual switch 515, then it does not matter if the new AP 120 connects to the same physical switch in the fabric node 305A used by the source AP or a different physical switch.

The AP 120 also informs the WLC 105 of the roam which in turn provides a new AP IP address to the map server 315 corresponding to the AP 120 and updates the corresponding client entry in the virtual switch 515. Thus, when performing the L2 roam, there is not inter-fabric node communication which mean this type of roam can be performed in only a few milliseconds (e.g., around 10 milliseconds).

Figure 6:
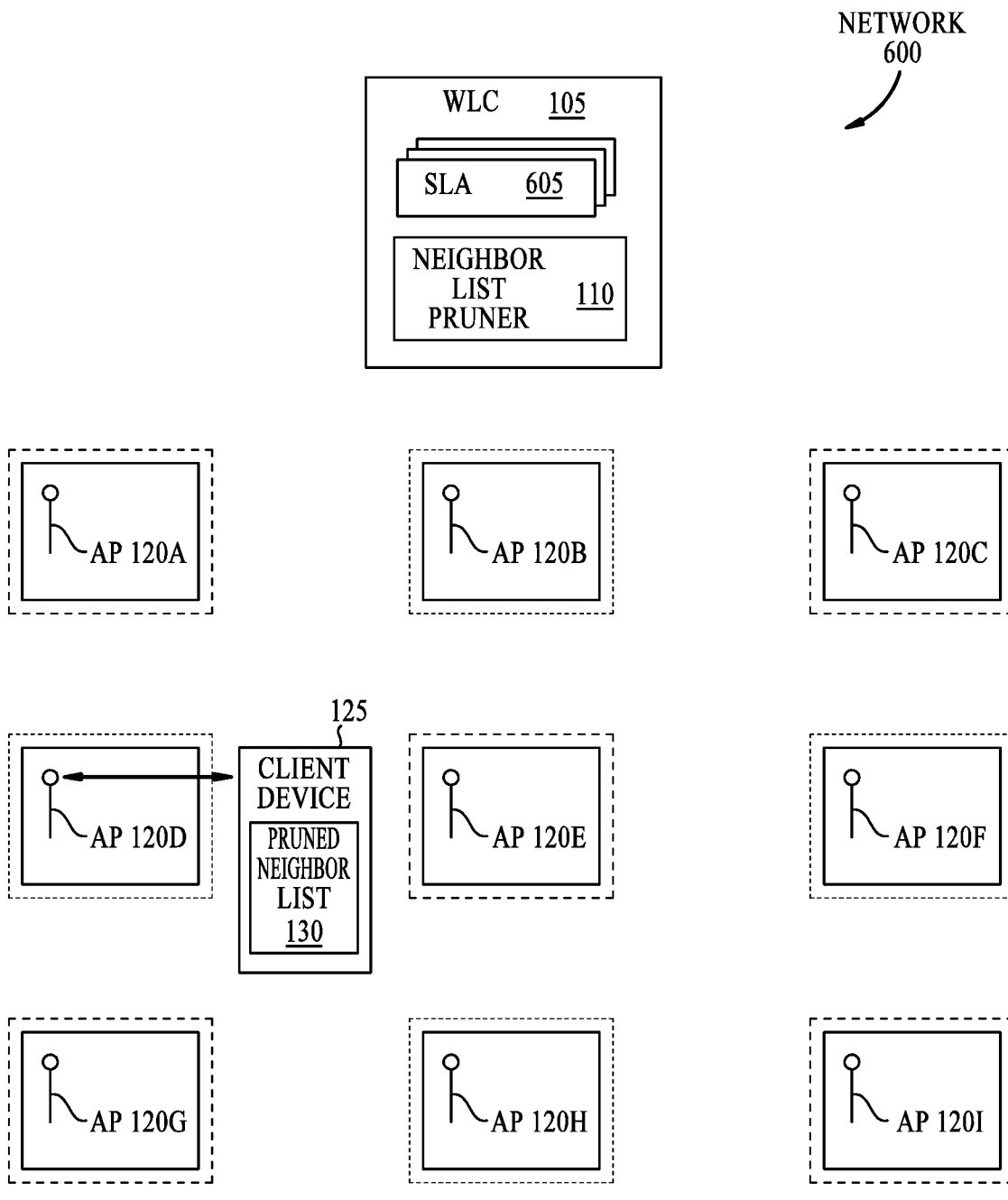
FIG. 6 illustrates a network that offers multi-tenancy Wi-Fi services, according to an embodiment described herein.

FIG. 6 illustrates a network 600 that offers multi-tenancy Wi-Fi services, according to an embodiment described herein. For example, the APs 120 may be arranged in a building or region that includes multiple tenants (e.g., multiple businesses) such as a mall or shopping center. The APs 120 may be indoors or outdoors and can be connected to a backend infrastructure (not shown). For example, the APs 120 could be assigned to different fabric nodes or could be assigned to the same fabric node.

In one embodiment, the APs 120 provide Wi-Fi access for client devices 125 (e.g., mobile phones) associated with a SP 610 (e.g., a cellular network). For example, the APs 120 can provide Wi-Fi for the client devices 125 when in a mall or other building where the cellular coverage may be spotty or suboptimal. Thus, to provide connectivity for the client devices when in the mall, the SP may contract with the operator of the network 600 to provide Wi-Fi access. Instead of using the cellular network, the client devices 125 can use the network 600 to access the Internet, make voice over IP (VoIP) calls, or perform other wireless functions. In one embodiments, some of the APs 120 (e.g., APs 120A-D and 120F-I) can have a common service set identifier (SSID) provisioned for multiple SPs 610.

The SPs 610, however, may have different coverage requirements. For example, some SPs 610 may want their subscribers to be able to use all of the APs 120 (e.g., maximum coverage area) while other SPs 610 may want their subscribers to access the APs 120 in certain locations such as in front of particular stores or in common areas (e.g., a food court). In network 600, the SP 610A has selected the maximum coverage area as represented by the solid lines being around all the APs 120A-120I. As such, the client devices 125 that subscribe to the SP 610A can use any one of the APs 120 for Wi-Fi access.

In contrast, the SPs 610B and 610C have limited coverage areas. In this example, the hashed lines represent that the subscribers to the SP 610B can use the APs 120A, 120C, 120G, and 120I to provide Wi-Fi access. The dotted lines represent that the subscribers to the service provide 610C can use the APs 120B, 120D, 120F, and 120H for Wi-Fi access. In one embodiment, the amount of coverage area provided by the APs 120 to each SP 610 is defined by service level agreements (SLA) 605 stored in the WLC 105. Put differently, the SLAs 605 indicate which of the APs can be used by the client devices 125 subscribed to each of the SPs 610.

The WLC 105 can use the SLAs 605 to provide pruned neighbor lists 130 to the client devices 125 to use when roaming. For example, the client device 125 in FIG. 6 is currently associated with the AP 120D. When generating the pruned neighbor list 130, in one embodiment the WLC 105 considers the SP 610 to which the client device 125 is subscribed. Because the client device 125 is communicating with the AP 120D, the client device 125 subscribes to either the SP 610A or the SP 610C. Here it is assumed the client device 125 corresponds to the SP 610C. Using that information, the WLC 105 provides a pruned neighbor list that includes only the neighboring APs to the AP 120D that are assigned to provide Wi-Fi access for the subscribers of the SP 610C. For example, if the APs 120A, 120B, 120E, 120G, and 120H are the neighboring APs to the AP 120D, the WLC

105 provides a pruned neighbor list 130 for the client device 125 that includes only the APs 120B and 120H.

The embodiments herein can be used with any SP and are not limited to subscribers to cellular networks. For example, other SPs could include cable, optical fiber, or satellite internet service providers (ISPs) which use the APs 120 to provide hot spots for customers who subscribe to their services. Other examples of SPs could be the tenants or business owners who use the network 600 to provide their customers with Wi-Fi access while visiting their establishments. However, in other embodiment, the present embodiments could be used in a loyalty program or based on a membership. For example, client devices owned by customers who are part of a loyalty program may receive different pruned neighbor lists than others who have no signed up for the program.

FIG. 7 is a flowchart of a method 700 for pruning neighbor lists depending on the SP type of a client device, according to an embodiment described herein. The method 700 may begin after block 210 of FIG. 2 where the AP that is currently associated with the client device sends a list of neighboring APs to the WLC. At block 705, the WLC identifies the SP corresponding to the client device. For example, when sending the neighboring list to the WLC, the AP may also forward identification data received from the client device which indicates the SP corresponding to the device. For example, based on an ID provided by the client device, the WLC can determine which cellular network the client device uses. In another example, the client device may provide authentication information to the WLC which indicates the ISP to which the customer is subscribed. In another example, the AP may have previously determined the SP corresponding to the client device and can forward this determination to the WLC. In yet another example, the WLC may have previously authenticated the client device to use the current AP, and thus, already knows which SP corresponds to the client device before generating the pruned neighbor list.

At block 710, the WLC identifies APs in the neighbor list assigned to provide Wi-Fi access to the corresponding SP. Referring to the example in FIG. 6, if the client device 125 is subscribed to the SP 610C, the WLC evaluates the neighboring APs to determine which of those APs are also assigned to provide Wi-Fi access to client devices for SP 610C.

At block 715, the WLC provides a pruned neighbor list to the client device having only the neighboring APs assigned to the SP. If the SP has the maximum coverage—i.e., all of the APs provide Wi-Fi access for that SP, such as the SP 610A—than the pruned neighbor list has the same number of APs as the original neighbor list provided by the AP 120D. However, if the SP is either the SP 610B or 610C, then the pruned neighbor list may have fewer neighboring APs than the original neighbor list.

At block 720, the WLC detects a roam performed by the client device using the pruned neighbor list. If the client device chooses an AP in the pruned neighbor list, then the roam may take less time than when choosing an AP that is not on the pruned list. For example, if the client device chooses an AP on the pruned list, then the AP will permit the client device to connect and resume Wi-Fi access. However, if the client device attempts to join an AP not on the list (i.e., an AP that is not assigned to provide Wi-Fi access to the SP corresponding to the client device), the AP denies the client device join request. Thus, the client device may try again (and again be denied) or attempt to join a different AP within wireless range, thereby increasing the time required to roam. However, if the client device selects one of the APs on the pruned neighbor list, it is assured to be authorized to use the AP, and thus, will not likely be denied (assuming the AP is not bandwidth limited). In this manner, using the SP corresponding to the client device to provide a pruned neighbor list may reduce roaming time.

In one embodiment, if the client device continues to attempt to roam to an AP not assigned to its corresponding SP, the AP eventually allows the client device to connect. For example, the system administrator may configure the APs to permit an unauthorized client device to connect after the client device sends a join request (and has been denied) three times even if the client device is subscribed to a different SP than the ones assigned to the AP. This ensures the client device is not permanently denied Wi-Fi access.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction(s) execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction(s) execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instruction(s)s may also be loaded onto a computer, other programmable data processing apparatus, or other devices to cause a series of operational blocks to be performed on the computer, other programmable apparatus or other devices to produce a computer implemented process such that the instruction(s)s which execute on the computer or other programmable apparatus provide processes for implementing the functions/acts specified in the flowchart and/or block diagram block or blocks.

The flowchart and block diagrams in the Figs. illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A wireless network controller, comprising:
a processor; and
memory configured to store an application which, when executed by the processor, is configured to perform an operation, the operation comprising:
receiving a neighbor list of neighboring access points (APs) for a first AP communicating with a client device;
pruning the neighbor list based on a predefined assignment corresponding to the first AP, wherein the predefined assignment comprises a first fabric node in a backend infrastructure that is assigned to the first AP, wherein the first fabric node comprises a plurality of network devices grouped to form a virtual network device, wherein pruning the neighbor list comprises identifying that the first AP is assigned to the first fabric node by querying a map server, and removing, from the neighbor list, at least one AP that is assigned to a second fabric node in the backend infrastructure to generate the pruned neighbor list;
forwarding the pruned neighbor list to the client device; and
detecting, after forwarding the pruned neighbor list, the client device has roamed from the first AP to a second AP listed in the pruned neighbor list.

2. The wireless network controller of claim 1, wherein the pruned neighbor list comprises only APs that are assigned to the first fabric node.

3. The wireless network controller of claim 1, wherein the client device performs a Layer 2 roam to move from the first AP to the second AP, wherein the second AP is assigned to the first fabric node.

4. The wireless network controller of claim 1, wherein pruning the neighbor list further comprises:
identifying at least one AP of the neighboring APs is not assigned to provide Wi-Fi access for a service provider corresponding to the client device; and
removing, from the neighbor list, the at least one AP of the neighboring APs to generate the pruned neighbor list.

5. The wireless network controller of claim 4, wherein the service provider is at least one of a cellular network and an internet service provider, wherein the client device is a subscriber of the cellular network or the internet service provider.

6. The wireless network controller of claim 1, wherein the operation further comprises:
updating a map server to indicate the client device is coupled to the second AP in response to detecting the client device has roamed.

7. A method, comprising:
receiving a neighbor list of neighboring APs for a first AP communicating with a client device;
pruning the neighbor list based on a predefined assignment corresponding to the first AP, wherein the predefined assignment comprises a first fabric node in a backend infrastructure that is assigned to the first AP, wherein the first fabric node comprises a plurality of network devices grouped to form a virtual network device, wherein pruning the neighbor list comprises identifying that the first AP is assigned to the first fabric node by querying a map server, and removing, from the neighbor list, at least one AP that is assigned to a second fabric node in the backend infrastructure to generate the pruned neighbor list;
forwarding the pruned neighbor list to the client device; and
detecting, after forwarding the pruned neighbor list, the client device has roamed from the first AP to a second AP listed in the pruned neighbor list.

8. The method of claim 7, wherein the pruned neighbor list comprises only APs that are assigned to the first fabric node.

9. The method of claim 7, wherein the client device performs a Layer 2 roam to move from the first AP to the second AP, wherein the second AP is assigned to the first fabric node.

10. The method of claim 7, wherein pruning the neighbor list further comprises:
identifying at least one AP of the neighboring APs is not assigned to provide Wi-Fi access for a service provider corresponding to the client device; and
removing, from the neighbor list, the at least one AP of the neighboring APs to generate the pruned neighbor list.

11. The method of claim 10, wherein the service provider is at least one of a cellular network and an internet service provider, wherein the client device is a subscriber of the cellular network or the internet service provider.

12. The method of claim 7, further comprising:
updating a map server to indicate the client device is coupled to the second AP in response to detecting the client device has roamed.

13. A non-transitory computer-readable storage medium storing instructions, which when executed on one or more processing devices, perform an operation for influencing roaming of a client device, the operation comprising:
receiving a neighbor list of neighboring APs for a first AP communicating with the client device;
pruning the neighbor list based on a service provider to which the client device is subscribed, wherein the pruned neighbor list includes a second AP, wherein pruning the neighbor list comprises identifying at least one AP of the neighboring APs is not assigned to provide Wi-Fi access for the service provider, and removing, from the neighbor list, the at least one AP of the neighboring APs to generate the pruned neighbor list;
forwarding the pruned neighbor list to the client device; and
detecting, after forwarding the pruned neighbor list, the client device has roamed from the first AP to the second AP listed in the pruned neighbor list.

14. The non-transitory computer-readable storage medium of claim 13, wherein pruning the neighbor list further comprises:
identifying a first fabric node in a backend infrastructure that is assigned to the first AP, wherein the first fabric node comprises a plurality of network devices grouped to form a virtual network device;
identifying that the first AP is assigned to the first fabric node by querying a map server; and
removing, from the neighbor list, at least one AP that is assigned to a second fabric node in the backend infrastructure to generate the pruned neighbor list.

15. The non-transitory computer-readable storage medium of claim 14, wherein the client device performs a Layer 2 roam to move from the first AP to the second AP, wherein the second AP is assigned to the first fabric node.

16. The non-transitory computer-readable storage medium of claim 13, wherein the service provider is at least one of a cellular network and an internet service provider, wherein the client device is a subscriber of the cellular network or the internet service provider.

17. The non-transitory computer-readable storage medium of claim 13, wherein the operation further comprises:
updating a map server to indicate the client device is coupled to the second AP in response to detecting the client device has roamed.

* * * * *